UNITED STATES PATENT OFFICE 2,267,155

DIPHENYLPHENOL

Russell L. Jenkins, Webster Groves, Mo., assignor to Monsanto Chemical Company, St. Louis, Mo., a corporation of Delaware No Drawing. Application October 12, 1940,
Serial No. 360,902

4 Claims. (Cl. 260—620)

The present invention relates to a new compound, 2,4-diphenylphenol, and salts thereof.

This application is a continuation-in-part of my copending application Serial No. 111,350, filed November 18, 1936, which has issued as Patent No. 2,240,073.

2,4-diphenylphenol, which can also be designated as 1,3-diphenyl-4-hydroxybenzene, is a white crystalline substance having a melting point of 90.0 to 90.2° C. and a boiling point of approximately 210° to 215° C. at a pressure of 4 mm. of mercury. The phenol and its salts are effective germicides and may be used as bactericides, fungicides, and for the preparation of disinfectants. 2,4-diphenylphenol also exhibits antioxidant properties on materials such as gasoline, lubricating oils, vegetable oils and rubber. With formaldehyde it condenses in the presence of acid and alkaline catalysts to yield oil-soluble resinous materials which are especially useful for the preparation of rapid-drying oil varnishes. The phenol is also an intermediate for the production of hydroxy carboxylic acids which correspond to substituted salicylic acids, by the method of the Kolbe synthesis, that is, by treatment of its alkali-metal salts with carbon dioxide under pressure.

The phenol may be prepared by a number of methods. The following procedure is illustrative of one general method which can be used for its preparation:

Fifty grams of 2,4-diphenylaniline (which can be obtained by the procedure described by Wardner and Lowy, J. Amer. Chem. Soc., 1932, vol. 54, page 2514, by nitration of diphenylbenzene and subsequent reduction of the resulting nitro compound) is heated in a beaker with 270.5 cc. of concentrated hydrochloric acid until a fine precipitate of the hydrochloride forms. The mixture is then cooled to 5°–10° C. A solution of 14.3 grams of sodium nitrite in 150 cc. of water, cooled to about 10° C., is then slowly added with stirring to the cooled mixture or slurry containing the hydrochloride crystals. The temperature of the reaction mixture is maintained below 10° C. Stirring is maintained for about 20 minutes after completion of the additions of sodium nitrite solution, after which the small quantity of insoluble matter is removed by filtration. The filtered diazonium salt solution at a temperature of about 15° C. is then added slowly with stirring to about 1 liter of boiling water. This addition should be made at such a rate that about 1 hour is required and the diazotized solution should be maintained at about 10° C. The hydroxy compound separates from the boiling water as a molten mass. The water containing the hydroxy compound is allowed to cool, whereupon the phenol becomes more viscous but still retains a noncrystalline appearance. The water is drained off and the phenol is washed several times with water.

The crude phenol may be purified by distillation in vacuum. Its boiling point is about 208°–221° C. at a pressure of 4 mm. of mercury. The fraction boiling at this temperature can be further purified by dissolving it in caustic soda solution and reprecipitating with hydrochloric acid. In this purification the phenol precipitates as an oil and crystallizes when cooled with ice. The crystals can be separated by filtration and when again distilled boil at a temperature of approximately 210°–215° C. at a pressure of 4 mm. The melting point of the pure phenol is 90.0–90.2° C. The phenol can also be conveniently crystallized from coal-tar solvent naphtha.

The foregoing method of preparation can be varied in conventional manner. 2,4-diphenylphenol can also be made by fusion of 2,4 diphenylbenzene sulfonic acid with alkali and by hydrolysis of 1-chloro-2,4-diphenylbenzene, according to the general procedures described in my copending application, Serial No. 111,350.

The sodium salt of 2,4-diphenylphenol is very soluble in water. It is conveniently prepared by neutralizing the pure phenol with stoichiometrical proportions of sodium hydroxide solution and recovering the salt by evaporation of the solution. Alternatively, the neutralized solution can be evaporated to a small volume and the solution can be allowed to crystallize slowly. The sodium salt is a white solid which crystallizes in the form of rectangular plates.

In an analogous manner the potassium and similar salts can be prepared. The recovery of salts which are insoluble in water can be made without recourse to evaporation, that is, they can be removed by filtration from the residual liquid.

The phenol coefficient of the sodium salt of 2,4-diphenylphenol is 5.5 against *Eberthella typhosa* and 8.3 against *Staphylococcus aureus*, both values being determined at 20° C. by the F. D. A. procedure (Circular No. 198, U. S. Dept. of Agriculture, Food and Drug Administration).

The preferred methods of practicing the invention have been recited but it is to be understood that the invention is not limited to any particular method of preparing the compounds specified, except insofar as such limitations are imposed by the appended claims.

I claim:
1. Compounds of the general formula

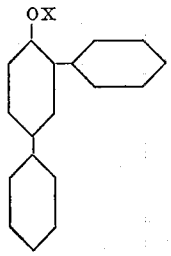

in which X is selected from the group consisting of hydrogen and alkali metals.

2. The compound, 2,4-diphenylphenol, which compound, when pure, is a white, crystalline solid, soluble in alcohol and benzene and substantially insoluble in water, and has a melting point of 90.0 to 90.2° C.

3. The sodium salt of 2,4-diphenylphenol, said salt being a crystalline solid soluble in water.

4. The potassium salt of 2,4-diphenylphenol, said salt being a crystalline solid soluble in water.

RUSSELL L. JENKINS.